US005193789A

United States Patent [19]

Tucker

[11] Patent Number: 5,193,789

[45] Date of Patent: Mar. 16, 1993

[54] AUTOMATIC CLAMPING APPARATUS

[75] Inventor: Claybon R. Tucker, Lavergne, Tenn.

[73] Assignee: Avco Corporation, Providence, R.I.

[21] Appl. No.: 836,056

[22] Filed: Feb. 12, 1992

[51] Int. Cl.[5] .......... B23Q 3/08
[52] U.S. Cl. .......... 269/32; 29/252; 269/233; 269/249
[58] Field of Search .......... 269/27, 31, 32, 34, 269/229, 233, 249; 29/252

[56] References Cited

U.S. PATENT DOCUMENTS

| | | | |
|---|---|---|---|
| 601,105 | 3/1898 | Rogers . | |
| 1,599,264 | 9/1928 | Yanchik . | |
| 2,168,134 | 8/1939 | Onsrud | 144/136 |
| 2,389,526 | 11/1945 | Maulding | 269/34 |
| 2,757,391 | 8/1956 | Stottlemeyer | 269/34 |
| 3,105,679 | 10/1963 | Westra | 269/32 |
| 3,482,830 | 12/1969 | Sendoykas | 269/32 |
| 3,567,208 | 3/1971 | Blatt | 269/32 |
| 3,737,157 | 6/1973 | Kiwalle | 269/31 |
| 3,807,719 | 4/1974 | Williamson | 269/34 |
| 4,351,516 | 9/1982 | Ersoy et al. | 269/32 |
| 4,438,984 | 3/1984 | Leppala | 81/54 |
| 4,494,463 | 1/1985 | Young et al. | 29/252 |
| 4,508,327 | 4/1985 | Ersoy | 269/32 |
| 4,618,131 | 10/1986 | Campisi et al. | 269/32 |
| 4,730,511 | 3/1988 | Tsujimura | 269/233 |

OTHER PUBLICATIONS

BTM Corporation, Brochure, Rotary-Linear Clamps 1500 and 2500 Series, 2 pages.
Pertinent portions (2 sheets) of engineering drawing of Avco Aerostructures Division, Tool No. 1527151-M-F-1-1.

*Primary Examiner*—J. J. Swann
*Attorney, Agent, or Firm*—Perman & Green

[57] ABSTRACT

Apparatus for releasably clamping a range of sizes of complex shaped articles having an upright web and laterally disposed upper and lower flanges. A first set of upper and lower flanges of an article placed on a work platform extends towards a first edge of the platform and a second set of upper and lower flanges extends towards a second edge thereof. One C-clamp on one side of the article terminating at a tip end is movable between an inactive position distant from the work platform and an active position at which the tip end grippingly engages one of the lower flanges of the article. As the C-clamp moves between the inactive and active positions, the tip end follows a path other than a continuous smooth arc so as to avoid striking the upper flange of the article. Another C-clamp, similarly constructed and operated, is provided on the other side of the article. An actuator is selectively operable to move each C-clamp which has a pair of cam followers slidably engageable with a shaped cam slot on a support plate integral with the work platform. A plurality of such clamps can be used at a plurality of spaced locations to fix an elongated article to an elongated work platform.

11 Claims, 4 Drawing Sheets

FIG. I

FIG. 4
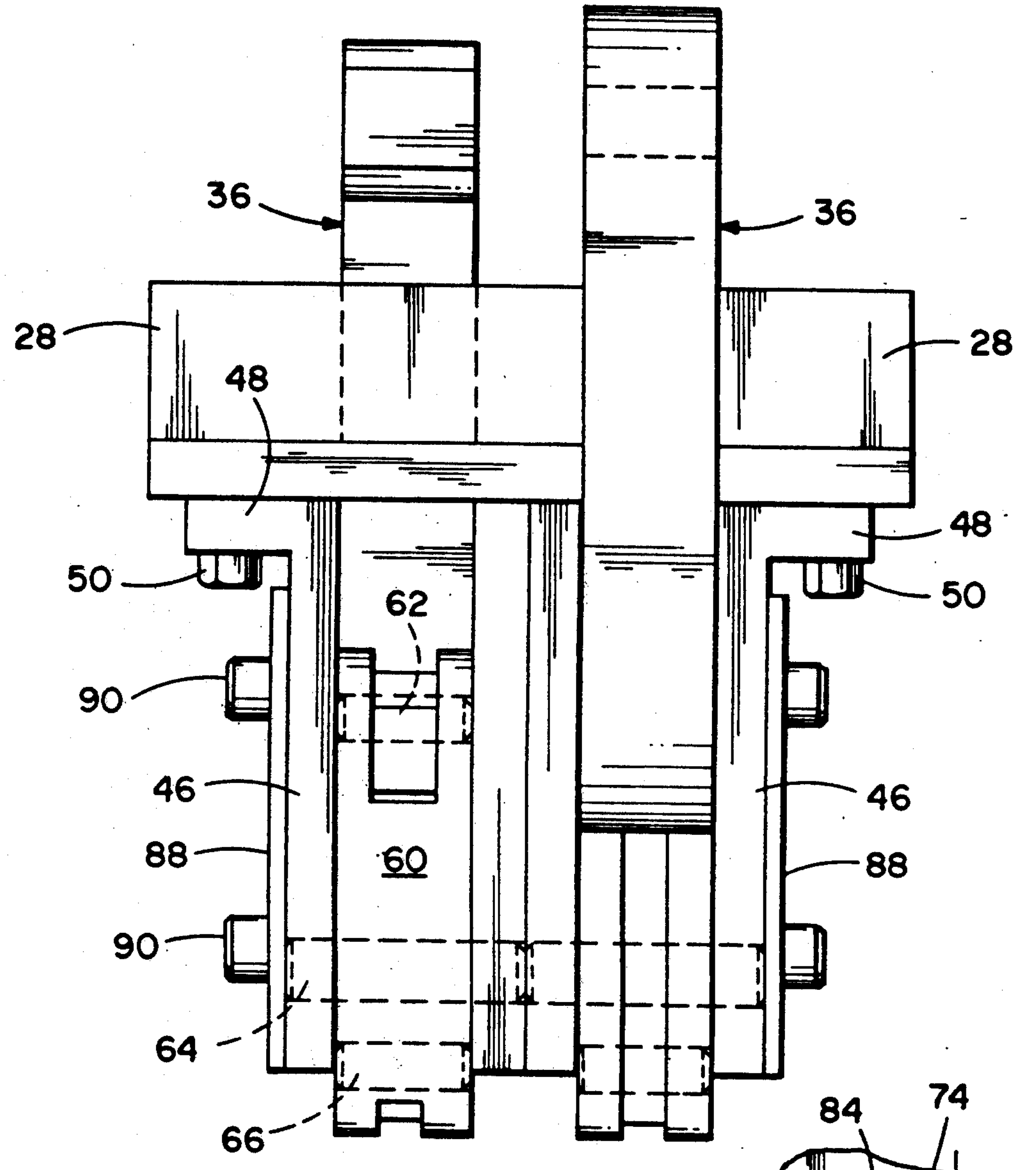
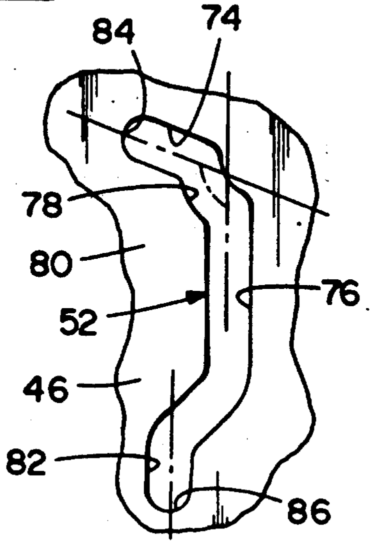
FIG. 5

AUTOMATIC CLAMPING APPARATUS

BACKGROUND OF THE INVENTION

1. Field of the Invention

The present invention relates generally to work holders, and particularly to clamping apparatus for releasably holding any one of a plurality of elongated articles having a range of sizes and shapes.

2. Description of the Prior Art

In order to function satisfactorily, a work clamp must be capable of withstanding the expected forces thereon and securely hold a workpiece in the installation in which it is to be used. In one popular version, a power operated pivotal jaw cooperates with a fixed base or jaw to releasably hold workpieces during handling thereof or performance of an operation thereon. It will be appreciated that in order to develop a sufficiently strong clamping force in this type of mechanism, it is desirable to employ a relatively long, jaw-carrying lever arm. This also is desirable for the reason that it facilitates complete and rapid withdrawal of the pivotal jaw for easy workpiece insertion and removal from the clamp.

Although this construction possesses the above advantages, it also has certain disadvantages. Particularly, a relatively long, jaw-carrying, pivotal lever arm requires considerable clearance beyond the end of the clamp structure to facilitate its movement. This, in turn, limits the number of such clamps that can be used in a given area and/or makes it difficult or impossible to employ this type of clamp with a work handling or operation performing device positioned close to the end of the clamp structure.

Pivotal jaw clamp constructions are desirable because their construction is relatively simple and inexpensive and yet are capable of developing high clamping forces. Thus, a clamp of this type capable of full jaw withdrawal and which requires a minimum of operational clearance for the movable jaw would be highly desirable.

Also known, are clamp constructions which employ a vertically disposed actuating cylinder located in relatively close proximity to the center line of the workpiece. In this instance, a holding clamp is fixed to an end of the rod operated by the actuating cylinder and lies in a plane perpendicular to the actuating rod. Longitudinal movement of the actuating rod changes the elevation of the plane of the holding clamp relative to the workpiece. Simultaneously, the actuating rod can be rotated about its longitudinal axis to move the clamp between an inactive position aligned with the longitudinal axis of the workpiece and an active position transverse of the workpiece. In the latter position, portions of the clamp are caused to overlie a flange of the workpiece and the cylinder is operated to draw the rod downwardly and pivot the clamp into engagement with the flange to grip the workpiece.

There are a number of drawbacks inherent in this design. In a first instance, the cylinder must be positioned closely adjacent the workpiece in order to minimize the cantilevered length of the clamp. Additionally, by reason of the cantilevered clamp design, the connection between the rod and the clamp is subjected to substantial bending stresses which are, in turn, transmitted to the cylinder. The stresses are harmful to seals within the cylinder and the life expectancy of the unit is thereby reduced. Furthermore, this design requires adequate room on either side of the cylinder extending in directions parallel to the workpiece in order to accommodate the rotary movement of the clamp in its horizontal plane. This substantially limits the placement and functioning of other machinery in the region of the workpiece, particularly, machinery which is necessary for operations on the workpiece itself.

The need presently exists to be able to releasably clamp any one of a plurality of elongated articles having a range of sizes and shapes. Stringers employed in the construction of aircraft wings represent a typical instance of such a need. In the course of manufacture, it is not unusual for successive stringers at a particular clamping location to be of a different size and shape than their predecessors. In the past, each newly sized and/or shaped stringer would require a new set-up to accommodate dimensional changes between the prior article and the subsequent article. This resulted in a time consuming and, therefore, costly procedure.

More recently, power operated pivotal jaw clamps have been devised which have enabled a plurality of clamps to be moved in a ganged manner between active and inactive positions. In this fashion, an article to be held can be selectively clamped or released without delay. Furthermore, the clamping apparatus can have sufficient built-in lost motion to accommodate the different sizes and shapes of the article being held.

Nonetheless, with the advent of ever more complex shapes into which stringers are formed, it has been necessary for the movable jaw of the clamp to move in a complex arc in order to avoid striking certain portions of the stringer while firmly clamping other portions thereof. By reason of the invention, articles being held having a particularly complex shape can be accommodated, and, the invention can be applied to a range of sizes and shapes of such articles.

SUMMARY OF THE INVENTION

The invention, then, relates to apparatus for releasably clamping a broad range of sizes of complex shaped articles having an upright web and laterally disposed upper and lower flanges. A work platform has an upper surface for receiving an article such that a first set of upper and lower flanges extend toward a first edge of the platform and a second set of upper and lower flanges extend toward a second edge thereof. One C-clamp on one side of the article terminating at a tip end is movable between an inactive position distant from the work platform and an active position at which the tip end grippingly engages one of the lower flanges of the article. As the C-clamp moves between the inactive and active positions, the tip end follows a path other than a continuous smooth arc so as to avoid striking the upper flange of the article. Another C-clamp, similarly constructed and operated, is provided on the other side of the article. An actuator is selectively operable to move each C-clamp which has a pair of cam followers slidably engageable with a shaped cam slot on a support plate integral with the work platform. To accommodate an elongated article, the work platform is elongated and the C-clamps are provided at spaced locations therealong. A plurality of C-clamps may be in an active position on one side of the article and in an inactive position on the other side of the article to enable an operation to be performed on the one side of the article, after which the relative positioning of the C-clamps can be reversed to enable an operation to be performed on the other side of the article.

An important object of the present invention is to provide an improved force and motion transmission mechanism for a pivotally operated clamp jaw wherein the jaw is fully withdrawable for ease of workpiece insertion and removal but which requires a minimum of operational clearance.

Another object of the invention is to provide clamping apparatus for selectively, releasably, holding any one of a plurality of elongated articles having a range of sizes and shapes. Yet another object is to provide such apparatus which can hold one side of the article while retracting sufficiently distant from the other side of the article to permit desired operation thereon.

Other and further objects of the present invention include the provision of a workpiece clamp of the above character which is relatively inexpensive to manufacture, simple but rugged in construction and reliable and smooth in operation.

Other objects and advantages of the present invention will become apparent from a consideration of the following detailed description taken in conjunction with the drawings in which like numerals refer to like parts throughout.

BRIEF DESCRIPTION OF THE DRAWINGS

FIG. 4 is a side elevation view of parts illustrated in FIG. 3;

FIG. 5 is a detail elevational view of a shaped cam slot embodying the present invention;

DETAILED DESCRIPTION OF THE PREFERRED EMBODIMENT

Figure 1:
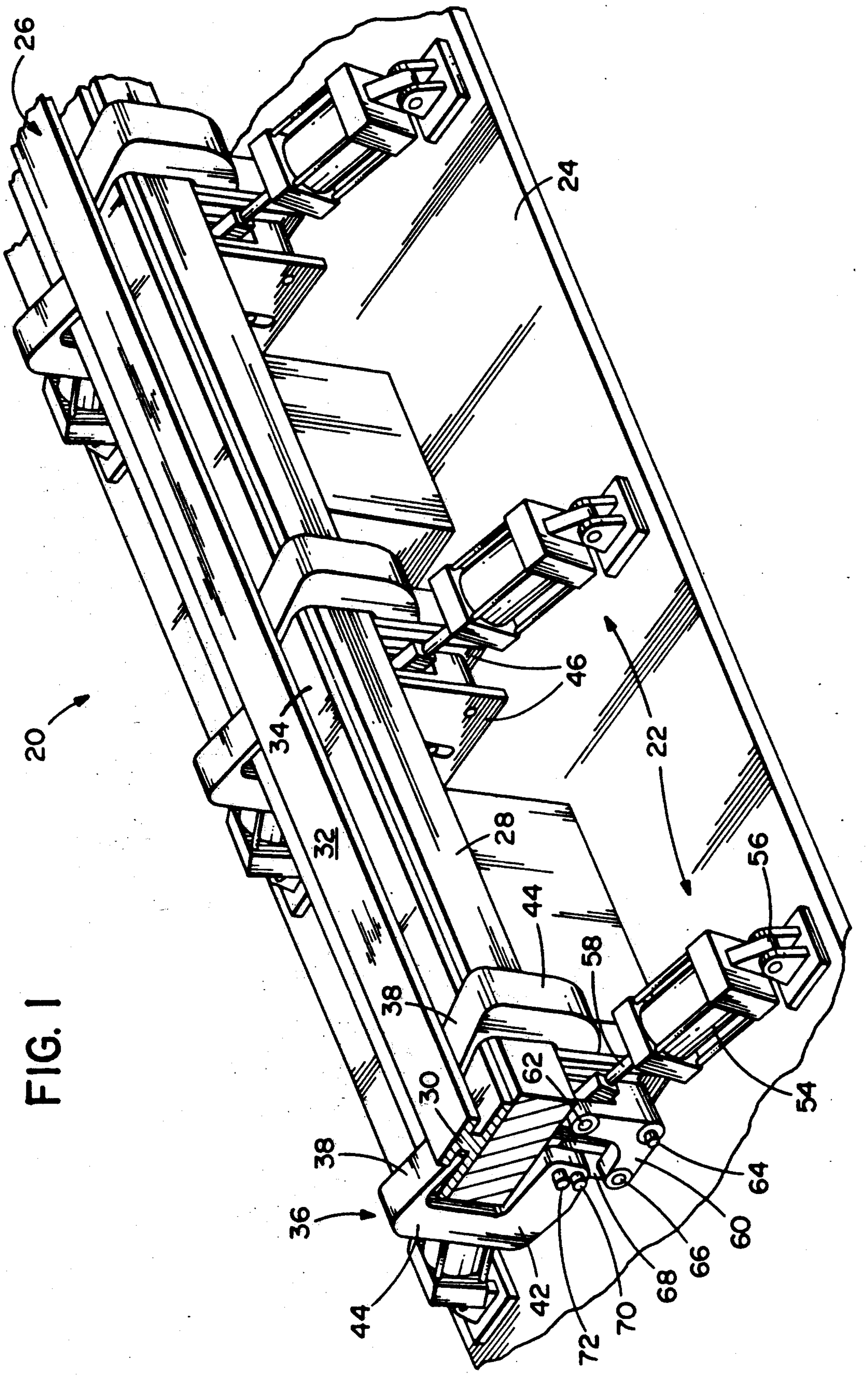
FIG. 1 is a perspective view illustrating a work station employing a plurality of clamping devices embodying the present invention.

Turn now to the drawings and, initially, to FIG. 1, which illustrates a typical work station 20 utilizing releasable clamping devices 22 embodying the present invention. As indicated in FIG. 1, a plurality of the clamping devices 22 are mounted on a work table 24 at spaced locations for purposes of holding an elongated workpiece 26 supported on a work platform 28 which is integral with, but extends along and above, the work table 24.

Figure 2:
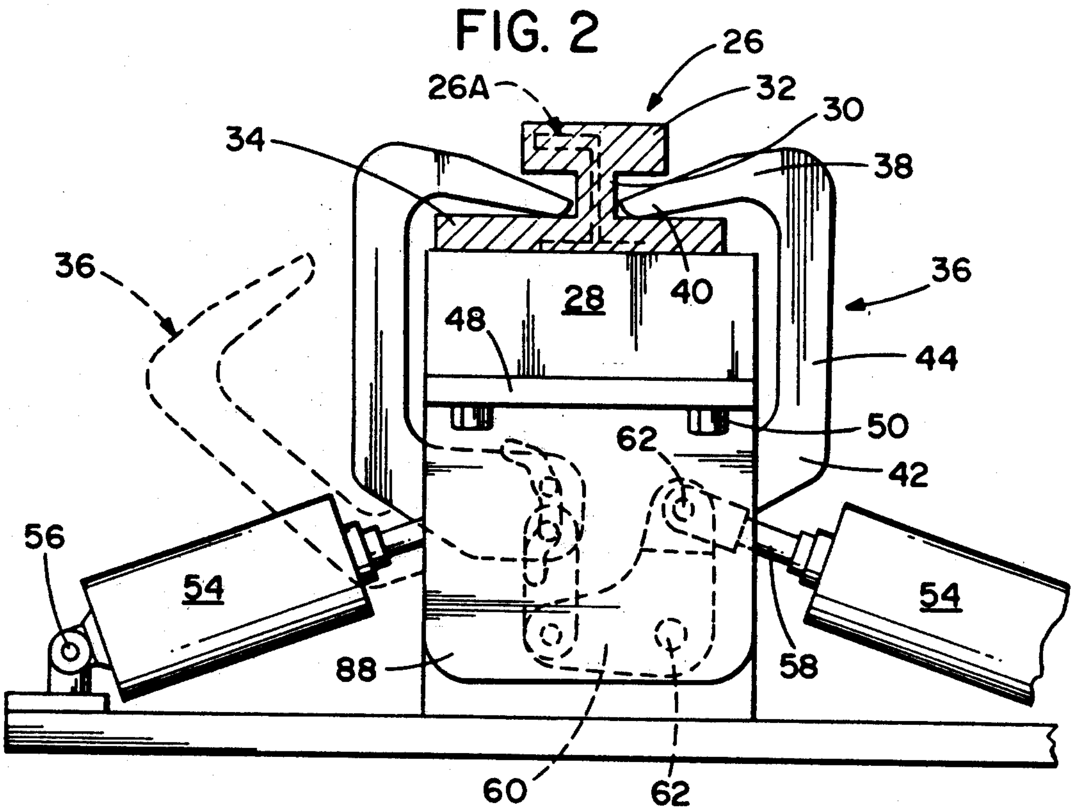
FIG. 2 is an end elevational view of the work station of FIG. 1 illustrating a pair of the clamping devices of the invention in an opposed relationship.

As seen in FIG. 1 and, even more clearly, in FIG. 2, the workpiece 26 being held by the clamping devices 22 is of a complex shape, a typical instance being a stringer employed in the construction of modern aircraft wings having a contoured airfoil. As illustrated, the workpiece 26 includes an upright web 30 and laterally disposed upper and lower flanges 32, 34 projecting outwardly from the web at vertically spaced locations.

Each clamping device 22 includes a C-clamp 36 for releasably, firmly, holding the workpiece 26 on an upper surface of the work platform 28. Each C-clamp 36 includes a distal member 38 extending to a tip end 40, a proximal member 42, and a bight member 44 interconnecting the distal member and the proximal member. In a preferred design, the longitudinal axis of the distal member and the longitudinal axis of the bight member form an acute angle. This relationship aids in the operation of the invention in a manner which will be explained below.

In a manner to be described, C-clamp 36 is moved between a withdrawn position distant from the workpiece 26 as indicated by dashed lines in FIG. 2, and a clamping position as indicated by solid lines. It will be appreciated that were the C-clamp 36 to merely follow a circular path between the withdrawn position and the clamping position, the tip end 40 would necessarily strike the upper flange 32 of the workpiece 26. For this reason, it is necessary that the C-clamp 36 follow a modified path between its withdrawn position and its clamping position in a manner which will be described. It is also noteworthy that the workpiece 26 is generally representative of the initial form assumed when placed on the work platform 28. At the conclusion of machining operations, it may actually assume a shape as indicated by dashed lines in FIG. 2 and indicated by reference numeral 26A. Thus, the C-clamp 36 must initially be able to firmly hold the workpiece 26 and, after the course of the operations thereon, be capable of firmly holding the workpiece 26A. The clamping device 22 must, therefore, be capable of holding the workpiece throughout the duration of time that operations are being performed on it.

The mechanism which assures movement of the C-clamp 36 in the path just indicated will now be described. A pair of support plates 46 are flanged at 48 for fixed attachment by means of bolts 50 to the underside of the work platform 28. The support plates 46 lie in parallel, spaced apart planes and each is provided with a shaped cam slot 52 which extends generally downwardly from the platform 28. The cam slots 52 in the support plates 46 are identically sized and shaped and are positioned in parallel side-by-side relationship. An actuator 54 which is preferably a pneumatic cylinder is pivotally mounted as at 56 to the work table 24 at a location laterally spaced from the centerline of the work platform 28. An extremity of an actuating rod 58 associated with the actuator 54 is pivotably connected by means of a pin 62 to one end of a bell crank 60 which, in turn, is pivotably mounted by means of a pin 64 fixed to, and extending between, the support plates 46. An end of the bell crank 60 opposite that carrying the pin 62 is pivotally connected by means of a pin 66 to one end of a link 68. The other end of the link 68 is pivotably mounted on a follower pin 70 which is fixed on a bifurcated end of the proximal member 42 of the C-clamp 36 and projects from opposite sides thereof. The projecting parts, or extremities, of the follower pin 70 are slidably engaged with the shaped cam slot 52.

A second follower pin 72 is also fixed to the proximal member 42 of the C-clamp 36 and projects from opposite sides thereof at a location spaced a short distance away from the follower pin 70. As in the instance of the follower pin 70, the projecting parts, or extremities, of the follower pin 72 are also slidably engaged with the shaped cam slot 52.

Thus, it will be appreciated that the C-clamp 36 lies generally in a plane intermediate and parallel IO to the support plates 46 and that the follower pins 70, 72 are integral with the C-clamp and have parallel axes which are generally perpendicular to the C-clamp and project from opposite sides of the C-clamp for slidable reception with the cam slots 52.

The cam slot 52 is most clearly illustrated in FIG. 5. It includes a first run 74 which extends a substantially straight first distance and a second run 76 extending a substantially straight second distance and angularly disposed relative to the first run. The second run 76 is substantially upright, that is, perpendicular to an upper surface of the work platform 28 and the first and second runs mutually subtend an obtuse angle. A third run 78 intermediate the first and second runs 74, 76 extends along an arc whose center is located outside of a region 80 subtended by the obtuse angle between the first and second runs. The cam slot 52 includes a fourth run 82 which communicates with the second run 76 at a location distant from the third run. The fourth run extends generally parallel to the second run 76 but laterally offset from the second run by reason of a jog 83 in the cam slot 52. The fourth run 82 extends to a lower terminus 86 which is at an extreme distance from an upper terminus 84 of the first run 74.

Figure 3:
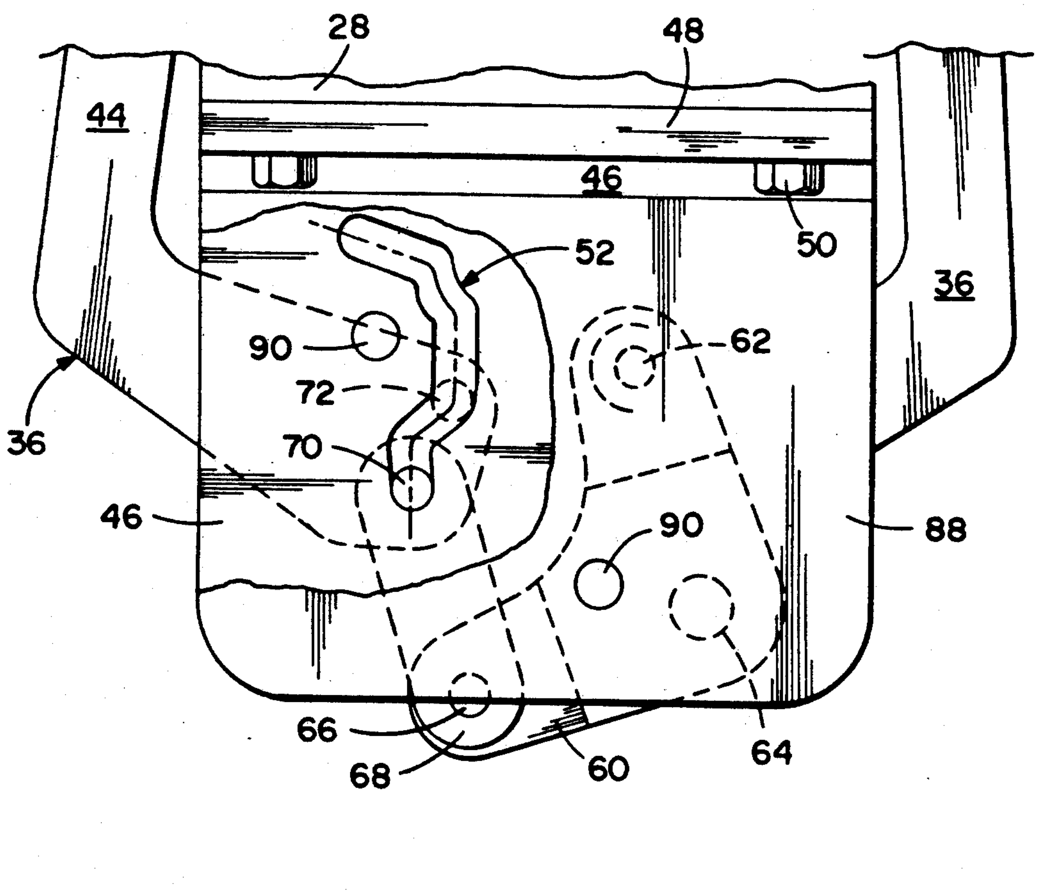
FIG. 3 is a detail elevational view illustrating parts of FIG. 2 in an enlarged manner.

As seen particularly well in FIGS. 3 and 4 and to a lesser extent in some of the other views, covers 88 are provided which are substantially coextensive with the outer surface of the support plates 46. The covers 88 serve primarily to overlie the shaped cam slot 52 to prevent any interference with the movement therein of the follower pins 70, 72 and undesirable entry of any foreign material. Suitable fasteners 90 are employed for securing the covers 88 on the support plates 46.

Figure 6:
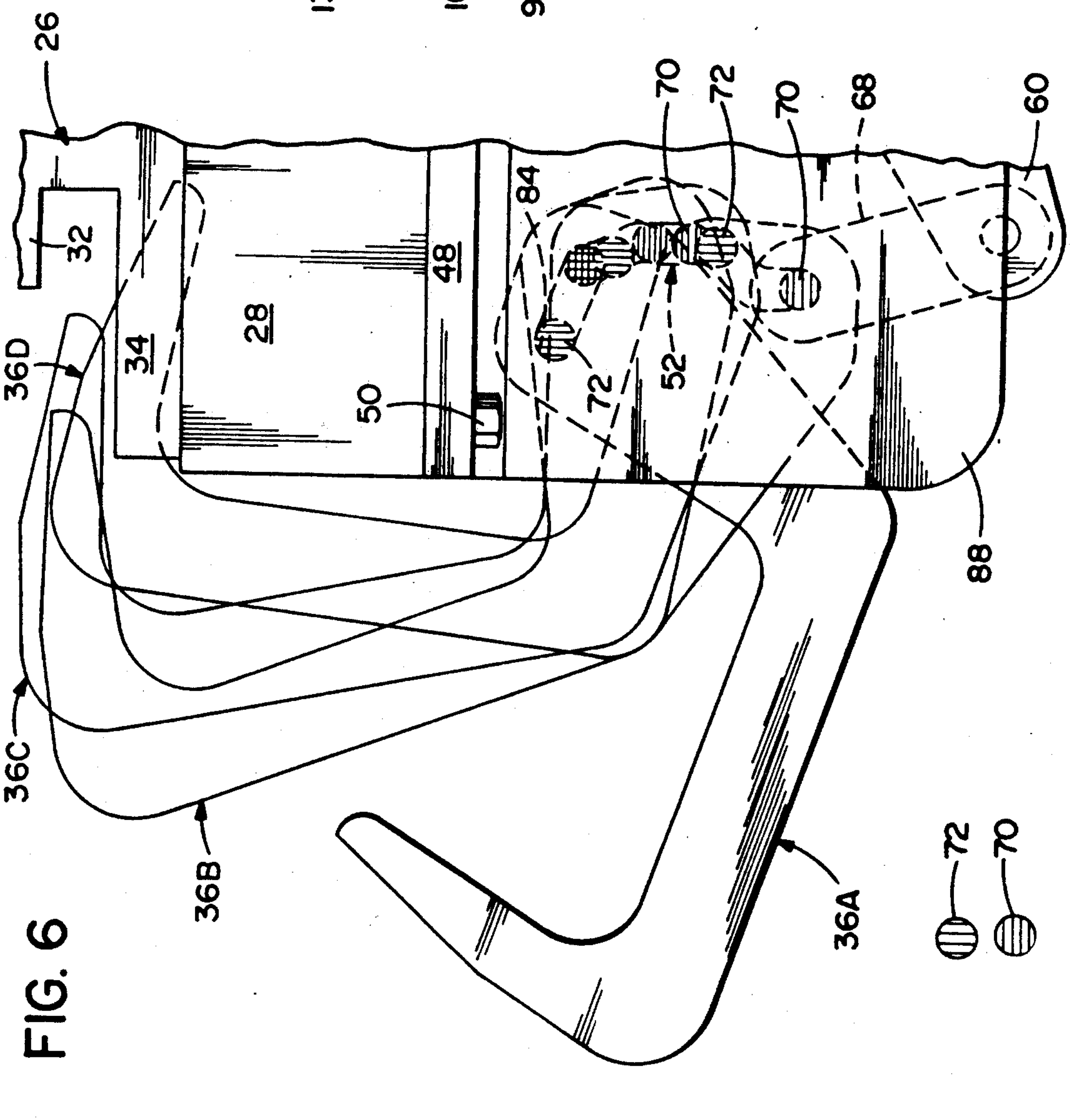
FIG. 6 is a detail end elevation view, enlarged, illustrating certain parts depicted in FIG. 2 and a plurality of successive positions of certain of those parts.

With particular attention now to FIG. 6, the operation of the invention resulting in desired travel of the C-clamps 36 will now be described. When the clamping device 22 is in a quiescent state, the actuating rod 58 is in a retracted position under the influence of the actuator 54. In this position of the actuating rod 58, the bell crank 60 assumes an extreme clockwise position about the pin 62 such that the C-clamp assumes a fully retracted position as indicated by a reference numeral 36A. In this position, the follower pin 72 engages the terminus 84 of the first run 74 (FIGS. 5 and 6). As the actuator 54 causes the actuating rod 58 to move toward an extended position, it moves the C-clamp 36 to successive arbitrarily illustrated positions indicated, respectively, by reference numerals 36B, 36C, and 36D in FIG. 6. The position of the C-clamp 36 indicated by reference numeral 36D in FIG. 6 is not intended to indicate an actual position of the C-clamp 36 but only a position which it could attain if it were not obstructed by the workpiece 26 or by the work platform 28. Because the workpiece 26 and the work platform 28 are actually present, the C-clamp 36 will actually assume a final, clamping, position in engagement with the lower flange 34 of the workpiece in the manner indicated in FIG. 2. Lost motion is provided for by the actuator 54.

Thus, with extension of the actuating rod 58, the tip end 40 is advanced to a position proximate the upper flange 32. Then, by reason of the third run 78, the tip end 40 is caused to skirt around an outermost extremity of the upper flange. The relationship between the distal member 38 and the bight 44 whereby together they subtend on an acute angle is of substantial added benefit in assuring that the tip end 40 will avoid striking the upper flange 32 of the workpiece 26. When the tip end 40 is thereby positioned in a plane lower than that of the upper flange 32, continued extension of the actuating rod 52 is effective to move the follower pins 70, 72 into and along the second run 76 of the cam slot 52. This continued motion is effective to draw the tip end 40 of the C-clamp 36 downwardly and into firm engagement with the upper surface of the lower flange 34.

With continued operation of the actuator 54, the cam followers 70, 72, continue to advance along the cam slot 52 until the cam follower 70 moves into engagement with the lower terminus 86 in the fourth run 82. By reason of the shape of the fourth run 82, the tip end 40 of the C-clamp 36 is caused to move, first, a short distance toward the web 30 of the workpiece 26, then into gripping engagement with the lower flange 34 of the workpiece. The purpose of the jog represented by the fourth run 82 at the lowermost region of the cam slot 52 is to maintain the position of the tip end 40 of the clamp as close as possible to the web 30 of the workpiece 26 during the terminal movement of the C-clamp 36. Placing the tip end 40 of the C-clamp 36 as close as possible to the centerline of the web 30 results in the application of the maximum possible clamping force to the workpiece 26.

The clamping devices 22 at the work station 20 can be operated in a number of different ways, as desired. For example, they can be operated in unison so that they all operate together to clamp the workpiece 26. In another instance, selected opposed pairs of clamping devices 22 can be operated to hold the workpiece at one location while others are retracted to enable milling, grinding, drilling, or other desirable operations to be performed in the region whereat those clamping devices would normally be engaged with the workpiece. In still another instance, all of the clamping devices 22 may be employed to engage the flange 34 on one side of the workpiece while all of the clamping devices on the other side of the workpiece will be in their withdrawn positions.

The present invention, as just described, is considered to be a significant advance, automating the clamping of complex shaped workpieces which previously had to be attended to manually. It is particularly valuable because of the ability of the clamping devices 22 to accommodate a whole range of sizes and shapes of workpieces 26. Because of this, it is not necessary to make a wholesale change of the work table 24 in order to accommodate each new sized or shaped workpiece.

Figure 7:
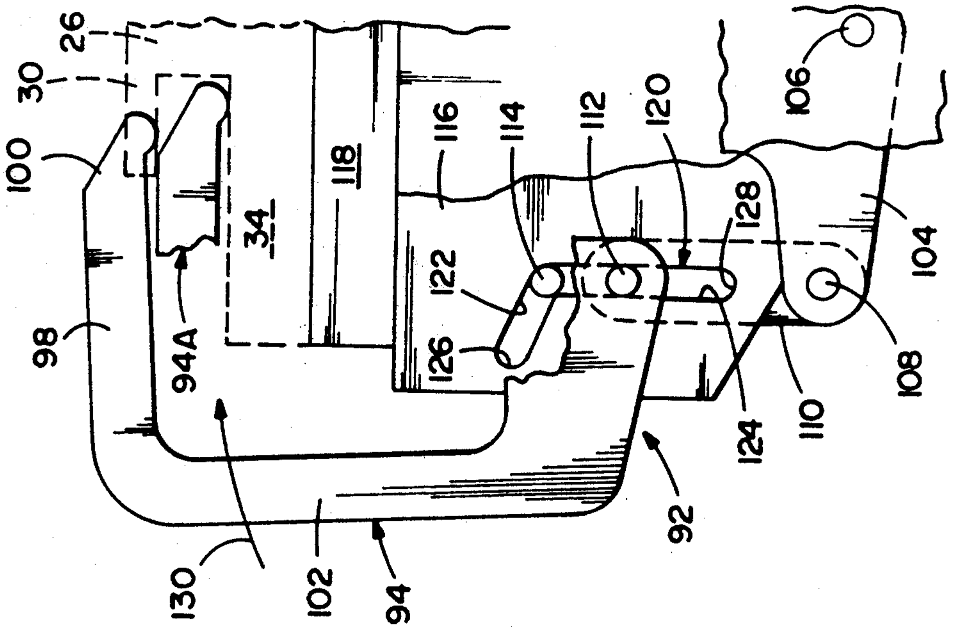
FIG. 7 PRIOR ART
FIG. 7 is a detail end elevational view illustrating a prior art clamping device.

FIG. 7 is illustrative of the clamping device 92 which was previously known to the inventor. It was because of the substantial drawbacks in the clamping device 92 that the present invention was devised. In FIG. 7, the clamping device 92 is seen to include a C-clamp 94 having a proximal member 96, a distal member 98 terminating at a tip end 100 and a bight member 102 joining the proximal member and the distal member. It is noteworthy that the distal member 98 and the bight member 102 are substantially perpendicular to one another. A bell crank 104, similar to the bell crank 60, is mounted in a suitable manner so as to pivot about a fixed pin 106 and is pivotally connected by a pin 108 to one end of a link 110. The other end of the link 110 is pivotally attached to a follower pin 112 fixed to the proximal member 96 and projecting outwardly therefrom. A second follower pin 114 is spaced from, but parallel to the follower pin 112 and also projects from the surfaces of the proximal member 96.

A pair of parallel spaced apart support plates 116 (only one is illustrated) depend from and are attached to a longitudinally extending work platform 118. Each of the support plates 116 is provided with a shaped cam slot 120 which has only two runs therein: a first generally straight run 122 which is angularly disposed relative to a second straight, generally upright second run 124. The follower pins 112, 114 are slidably engaged with the cam slot 120. When the bell crank is moved by a suitable actuator (not shown) to the point at which the cam follower 114 engages a terminus 126 of the run 122, the C-clamp 94 is in its withdrawn position with the tip end 100 distant from the workpiece 26. However, as the bell crank 104 is operated to draw the follower pin 112 toward a terminus 128 of the second run 124, the C-clamp 94 passes through its position indicated by solid lines to its final clamped position indicated by the notation 94A.

While the prior art clamping device 92 is adequate for purposes of clamping workpieces of relatively simple shape, it is clearly seen in FIG. 7 that it is unable to satisfy the clamping requirement for a workpiece of more complex shape such as the workpiece 26. In the instance depicted in FIG. 7, it is seen that the follower pin 114 is just leaving the run 122 and entering the run 124, the follower pin 112 already well into the run 124. As the C-clamp 94 is moved in the direction of an arrow 130, the tip end 100 has followed an arcuate path which would adequately move down and into engagement with the lower flange 34 of the workpiece 26, in the absence of the upper flange 32. However, in the presence of the flange 32, it would strike that flange and be incapable of reaching the lower flange without harm to itself or to the flange 32. It is only by reason of the shaped cam slot 52 of the present invention, with the aid of the revised shape of the C-clamp 36, that clamping of the workpiece 26 can be achieved.

While a preferred embodiment of the invention has been disclosed in detail, it should be understood by those skilled in the art that various other modifications may be made to the illustrated embodiments without departing from the scope of the invention as described in the specification and defined in the appended claims.

What is claimed is:

1. Apparatus for releasably clamping one of a variety of sizes of complex shaped articles having an upright web and vertically spaced and laterally disposed upper and lower flanges projecting outwardly from the web, said apparatus comprising:

a work platform including an upper surface for supporting the article thereon, said upper surface extending to a peripheral edge;

support plate means having a shaped cam slot therein and extending downwardly from said platform;

a C-clamp lying generally in a clamping plane and including a distal member extending to a tip end, a proximal member, and a bight member interconnecting said distal member and said proximal member, said C-clamp including a pair of spaced cam followers on said proximal member slidably engaged with said cam slot for moving said C-clamp between an inactive position distant from said work platform and an active position whereat said bight member is proximate said peripheral edge and said tip end overlies said upper surface at a location distant from said peripheral edge;

actuating means operably connected to said proximal member for selectively drawing said cam followers along said cam slot and thereby moving said C-clamp between said inactive position and said active position;

said cam slot including a first run extending a substantially straight first distance, a second run extending a substantially straight second distance and angularly disposed relative to said first run and said first and second runs mutually subtending an obtuse angle, and a curved third run intermediate said first and second runs extending along an arc whose center is located outside of the region subtended by said obtuse angle, said first, second, and third runs being shaped such that operation of said actuating means to cause movement of said cam followers from said first run to said second run causes said tip end to move within said clamping plane along a predetermined path from an initial withdrawn position when said C-clamp is in said inactive position to a final position grippingly engaged with the lower flange of the article when said C-clamp is in said active position, said path being a continuous smooth first arc until said tip end is substantially adjacent an extremity of the upper flange of the article, whereupon said path changes direction into an oppositely curved second arc such that with continued advancement of said cam followers along said cam slot, said tip end avoids striking the upper flange on the article and continues along said path toward the web of the article and intermediate the upper and lower flange, then said path again changes direction into a substantially straight line such that with continued advancement of said cam followers along said cam slot, said tip end moves into gripping engagement with the lower flange of the article.

2. Apparatus as set forth in claim 1 wherein said actuating means includes:

an actuator pivotally mounted on said base and including an actuating rod movable between extended and retracted positions;

a link pivotally mounted to one of said cam followers; and a bell crank pivotally mounted on said support plate means and including first and second extremities, said first extremity being pivotally connected to said actuating rod, said second extremity being pivotally connected to said link distant from said cam follower;

whereby movement of said actuating rod between said extended and retracted positions is effective to move said C-clamp between said inactive and active positions, respectively.

3. Apparatus as set forth in claim 1 wherein said actuator is pneumatically operated.

4. Apparatus as set forth in claim 1 wherein said cam slot includes a fourth run communicating with said second run distant from said third run and extending in a direction generally parallel to but laterally offset from said second run, said fourth run terminating at a location distant from said first run and shaped such that continued operation of said actuating means to cause movement of at least one of said cam followers along said fourth run causes said tip end to move along the predetermined path until, immediately prior to moving into gripping engagement with the lower flange of the article, said tip end is caused to move a short distance toward the web thereof into gripping engagement with the lower flange of the article.

5. Apparatus as set forth in claim 1 wherein said support plate means includes a pair of parallel, spaced apart, support plates, each having a shaped cam slot therein, the cam slots being congruent;

wherein said C-clamp lies generally in a plane intermediate and parallel to said support plates; and wherein said cam followers include cylindrical pins integral with said C-clamp and have parallel axes generally perpendicular to said C-clamp and project from opposite sides of said C-clamp for slidable reception with said cam slots.

6. Apparatus for releasably clamping one of a variety of sizes of elongated complex-shaped articles having an upright web and vertically spaced and laterally disposed upper and lower flanges projecting outwardly from the web, said apparatus comprising:

a base;

a work platform including an upper surface a peripheral edge overlying said base;

a plurality of support plate means, each having a shaped cam slot therein and extending downwardly from said platform at longitudinally spaced locations;

a C-clamp associated with each of said support plate means including a distal member extending to a tip end, a proximal member, and a bight member interconnecting said distal member and said proximal member, said C-clamp including a pair of spaced cam followers on said proximal member slidably engaged with said cam slot for moving said C-clamp between an inactive position distant from said work platform and an active position whereat said bight member is proximate said peripheral edge and said tip end overlies said upper surface at a location distant from said peripheral edge;

a plurality of actuating means positioned at longitudinally spaced locations, one of said actuating means being associated with each of said C-clamps and operably connected to said proximal member for selectively drawing said cam followers along said cam slot and thereby moving said C-clamp between said inactive position and said active position;

said cam slot including a first run extending a substantially straight first distance, a second run extending a substantially straight second distance and angularly disposed relative to said first run and said first and second runs mutually subtending an obtuse angle, and a third run intermediate said first and second runs extending along an arc whose center is located outside of the region subtended by said obtuse angle, said first, second, and third runs being shaped such that operation of said actuating means to cause movement of said cam followers from said first run to said second run causes said tip end to move within said clamping plane along a predetermined path from an initial withdrawn position when said C-clamp is in said inactive position to a final position grippingly engaged with the lower flange of the article when said C-clamp is in said active position, said path being a continuous smooth first arc until said tip end is substantially adjacent an extremity of the upper flange of the article, then said path changes direction into an oppositely curved second arc such that with continued advancement of said cam followers along said second run, said tip end avoids striking the upper flange on the article and continues along said path toward the web of the article and intermediate the upper and lower flange, then said path again changes direction into a substantial straight line, with continued advancement of said cam followers along said cam slot, said tip end moves into gripping engagement with the lower flange of the article.

7. Apparatus as set forth in claim 6 wherein each of said actuating means includes:

an actuator pivotally mounted on said base and including an actuating rod movable between extended and retracted positions;

a link pivotally mounted to one of said cam followers; and a bell crank pivotally mounted on said support plate means and including first and second extremities, said first extremity being pivotally connected to said actuating rod, said second extremity being pivotally connected to said link distant from said cam follower;

whereby movement of said actuating rod between said extended and retracted positions is effective to move said C-clamp between said inactive and active positions, respectively.

8. Apparatus for releasably clamping one of a variety of sizes of complex-shaped articles having an upright web and vertically spaced and laterally disposed upper and lower flanges projecting outwardly from the web, said apparatus comprising:

a base;

a work platform including an upper surface extending between first and second spaced edges overlying said base for supporting the article thereon such that first upper and lower flanges on an article extend toward said first edge and second upper and lower flanges on the article extend toward said second edge;

support plate means extending downwardly from said platform and having first and second shaped cam slots therein;

a first C-clamp lying generally in a first clamping plane and including a distal member extending to a tip end, a proximal member, and a bight member interconnecting said distal member and said proximal member, said first C-clamp including a pair of spaced cam followers on said proximal member slidably engaged with said first cam slot for moving said first C-clamp between an inactive position distant from said work platform and an active position whereat said bight member is proximate said first edge and said tip end overlies said upper surface at a location distant from said first edge;

a second C-clamp lying generally in a second clamping plane and including a distal member extending to a tip end, a proximal member, and a bight member interconnecting said distal member and said proximal member, said second C-clamp including a pair of spaced cam followers on said proximal member slidably engaged with said second cam slot for moving said second C-clamp between an inactive position distant from said work platform and an active position whereat said bight member is proximate said second edge and said tip end overlies said upper surface at a location distant from said second edge;

first actuating means operably connected to said proximal member of said first C-clamp for selectively drawing said cam followers thereof along said first cam slot and thereby moving said first C-clamp within said first clamping plane between said inactive position and said active position;

second actuating means operably connected to said proximal member of said second C-clamp for selectively drawing said cam followers thereof along said second cam slot and thereby moving said second C-clamp within said second clamping plane between said inactive position and said active position;

each of said first and second cam slots including a first run extending a substantially straight first distance, a second run extending a substantially straight second distance and angularly disposed relative to said first run and said first and second runs mutually subtending an obtuse angle, and a third run intermediate said first and second runs extending along an arc whose center is located outside of the region subtended by said obtuse angle, said third run of said first cam slot being shaped such that operation of said first actuating means to cause movement of said first cam followers from said first run to said second run causes said tip end to move within said first clamping plane along a predetermined path from an initial withdrawn position when said first C-clamp is in said inactive position to a final position grippingly engaged with the first lower projection of the article when said first C-clamp is in said active position, said path being a continuous smooth first arc, until said tip end is substantially adjacent an extremity of the first upper flange of the article, then said path changes direction into an oppositely curved second arc such that with continued advancement of said cam followers along said first cam slot, said tip end avoids striking the upper flange on the article and continues along said path toward the web of the article and intermediate the first upper and lower flange, then said path again changes direction into a substantially straight line curvature such that with continued advancement of said cam followers along said cam slot, said tip end moves into gripping engagement with the first lower flange of the article; and said third run of said second cam slot being shaped such that operation of said second actuating means to cause movement of said second first cam followers from said first run to said second run causes said tip end to move within said second clamping plane along a predetermined path from an initial withdrawn position when said second C-clamp is in said inactive position to a final position grippingly engaged with the second lower projection of the article when said second C-clamp is in said active position, said path being a continuous smooth first arc until said tip end is substantially adjacent an extremity of the second upper flange of the article, then said path changes direction into an oppositely curved second arc such that with continued advancement of said cam followers along said second run, said tip end avoids striking the upper flange on the article and continues along said path toward the web of the article and intermediate the second upper and lower flange, then said path again changes direction into a substantially straight line curvature such that with continued advancement of said cam followers along said cam slot, said tip end moves into gripping engagement with the second lower flange of the article.

9. Apparatus as set forth in claim 8 wherein said first and second C-clamps lie in parallel spaced apart planes.

10. Apparatus for releasably clamping one of a variety of sizes of complex shaped articles having an upright web and vertically spaced and laterally disposed upper and lower flanges projecting outwardly from the web, said apparatus comprising:

a work platform including an upper surface for supporting a complex shaped article thereon, said upper surface extending to a peripheral edge;

guide means on said work platform;

a C-clamp including a distal member extending to a tip end, a proximal member slidably engageable with said guide means, and a bight member interconnecting said distal member and said proximal member, said C-clamp pivotally mounted on said work platform for movement between an inactive position distant from said work platform and an active position whereat said bight member is proximate said peripheral edge and said tip end overlies said upper surface at a location distant from said peripheral edge; and actuating means operably connected to said proximal member for moving said proximal member of said C-clamp along said guide means between said inactive position and said active position and for guiding thereby said tip end along a path defined by said guide means which is a continuous smooth first arc until said tip end is substantially adjacent an extremity of the upper flange of the article, then which path changes direction into an oppositely curved second arc approaching the web of the article and intermediate the upper and lower flange, then which path again changes direction into a substantially straight line until said tip end moves into gripping engagement with the lower flange of the article.

11. Apparatus as set forth in claim 10 wherein said distal member has a longitudinal axis which forms an acute angle with a longitudinal axis of said bight member.

* * * * *